2,935,479
COMPOSITION FOR ENGINE DEPOSIT REMOVAL

Paul E. Oberdorfer, Jr., Claymont, Del., assignor to Sun Oil Company, Philadelphia, Pa., a corporation of New Jersey No Drawing. Application July 2, 1956
Serial No. 595,055

3 Claims. (Cl. 252—170)

This invention relates to removing deposits from fuel and air intake systems and from combustion chambers of internal combustion engines.

The formation of gummy deposits on parts of internal combustion engine fuel and air intake systems is an important problem affecting efficient engine operation. The formation of these deposits in a carburetor, for example, can cause sticking of the automatic choke, plugging of the air bleeds, fouling of the venturi, restriction of idle air flow around the throttle blades, and other conditions which adversely affect engine operating efficiency. The formation of deposits in jet engine fuel systems causes filter plugging and other operational difficulties.

The formation of carbonaceous deposits on surfaces in the engine combustion chambers is also an important problem affecting both spark ignition and compression ignition engines. Combustion chamber deposits cause increased engine wear, preignition and engine knocking, and increase the octane requirement of an engine.

Now, in accordance with the present invention, the accumulation of deposits in engine fuel and air intake systems and in engine combustion chambers is reduced by contacting these deposits with a cyclic carbonate inner ester such as propylene carbonate. The cyclic carbonate inner ester loosens and dissolves engine deposits and enables the deposits to be exhausted from the engine.

Cyclic carbonate inner esters which are used in this invention have the formula:

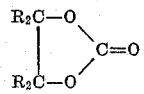

where each R is hydrogen or a hydrocarbon group. The hydrocarbon groups can be alkyl, aryl, aralkyl, and alkaryl groups preferably having about 1–15 carbon atoms per group. Cyclic carbonate esters having fewer carbon atoms are generally more effective in reducing deposit accumulation than are esters having more carbon atoms. It is preferred that the total carbon atoms in the hydrocarbon substituent groups not exceed about 15. The use of propylene carbonate is especially preferred in carrying out the invention. Specific examples of other cyclic carbonate inner esters which can be used are ethylene carbonate, butylene carbonates, amylene carbonates, phenyl ethylene carbonate, and the like. Mixtures of cyclic carbonate inner esters can be used in the invention.

The present invention can be carried out in several different ways. In one specific practice of the invention, a cyclic carbonate inner ester, e.g., propylene carbonate, is incorporated in internal combustion engine fuel. During subsequent engine operation, the esters contact and remove deposits, thus providing for continuous deposit removal during engine operation. In another practice of the invention, the cyclic carbonate inner esters alone or together with an organic solvent are used periodically in servicing the engine to remove deposits. Other methods for contacting engine deposits with cyclic carbonate inner esters can be employed.

In a specific embodiment of this invention, the novel deposit removing esters are directly incorporated in fuel used in an engine. Spark ignition engine fuels including jet engine fuels and compression ignition engine fuels can be treated. In this embodiment, a cyclic carbonate inner ester as above described, e.g., propylene carbonate, is incorporated in internal combustion engine fuel in small but sufficient amount to lessen engine deposit accumulation. Usually use of the carbonate ester in amount in the range of about 0.01% to 5% by volume of the fuel and preferably 0.05% to 2% gives good results. Amounts outside this range can be used, however.

The fuel to which the carbonate inner ester is added is preferably spark ignition engine fuel comprising a mixture of gasoline hydrocarbons boiling in the range of about 80° F. to 440° F. and usually about 90° F. to 400° F. However, the carbonate esters can also be added to diesel engine fuel comprising hydrocarbons boiling in the range of about 400° F. to 750° F., and to jet engine fuels comprising hydrocarbons boiling in the range of about 100° F. to 600° F. The fuels used in this embodiment of the invention can contain, in addition to the cyclic carbonate inner esters, any of the fuel additives commonly used in the art such as tetraethyl lead, iron carbonyl, bis-cyclopentadienyl iron, scavengers, detergents, inhibitors, and the like.

In this embodiment of the invention, when the fuel containing the cyclic carbonate inner ester is used in an engine, the ester continuously contacts deposits which are on fuel intake surfaces and combustion chamber surfaces during engine operation. The inner ester dissolves and loosens these deposits thus enabling the deposits to be exhausted from the engine. In this way, the accumulation of engine deposits is reduced in this embodiment of the invention.

The addition of the cyclic carbonate inner esters to engine fuels has an additional advantage. The cyclic esters are fairly viscous and high boiling, and they give a measure of added lubricity to the fuel when incorporated therein. Upon introduction into engine combustion chambers with the fuel, the esters act as upper cylinder lubricants as well as deposit removers.

In a second embodiment of the invention, engines are periodically serviced to remove deposits by the addition of the cyclic carbonate inner esters, e.g., propylene carbonate, to the air intake passage of the engine. This embodiment of the invention is especially suitable for cleaning carburetors of carbureted engines.

In this embodiment of the invention, the cyclic carbonate ester can be added singly to the air intake of the engine. However, in preferred practice of the invention, the carbonate ester is used in admixture with a less viscous organic solvent which improves the penetration of the cyclic ester.

Cyclic carbonate inner esters are fairly viscous liquids with high surface tension. Propylene carbonate, for example, has a kinematic viscosity at 100° F. of 1.68 centistokes and a surface tension of 43.4 dynes per cm. at 68° F. In practice of this embodiment of the invention, it is often desirable to remove deposited material from relatively cool portions of the engine, e.g., from the upper portions of the carburetor air horn. In order to insure high deposit removal from these engine parts, it is usually desirable to lessen the viscosity and surface tension of the cyclic ester thereby to improve the ester penetration by using it in admixture with less viscous liquid.

Fairly inert liquids such as light hydrocarbons can be used to lessen the viscosity of the carbonate ester. However, it is preferred to use polar organic liquids which themselves have some solvent activity towards engine deposits. It is especially desirable to use liquids with the cyclic carbonate esters which are substantially lower boiling than the cyclic esters. These last liquids improve the penetration of the cyclic esters in cool parts of the engine such as the carburetor, while in the hot parts such as around the valve stems and piston rings, the low boiling liquids evaporate and separate from the cyclic esters thereby improving the lubricity of the cyclic esters where it is most needed. Mixtures of more than one liquid can be used to improve the penetration of the cyclic carbonate esters. Examples of such liquids which can be used in this embodiment of the invention with the carbonate esters are hydrocarbons such as pentane and hexane; alcohols such as ethanol, propanol, isopropanol and butanol; esters such as methyl acetate, ethyl acetate, propyl acetate, and isopropyl acetate; ethers such as ethylene glycol mono ethyl ether, ethylene glycol mono methyl ether and ethylene glycol mono propyl ether; and the like.

When these liquids are used with the cyclic carbonate esters, the esters should be used in deposit removing amounts, i.e., in amount sufficient to effectively remove deposits. Usually it is preferred to maintain the carbonate ester concentration at at least about 20% by volume in order to insure high deposit removal efficiency. A solvent formulation which has been found to give especially good deposit removal comprises by volume 25–60% propylene carbonate, 40–70% ethyl acetate, and 2–20% ethylene glycol mono ethyl ether.

In carrying out this embodiment of the invention, deposits are removed from an engine periodically by adding the deposit removing formulations to the engine air intake passage while the engine is running. The engine can then be turned off for a short time during which the cycled ester loosens and dissolves deposits. The engine can then be restarted and run to exhaust the deposits from the engine. A convenient method for introducing the deposit removing formulations into the intake passage comprises ejecting the formulations from a squeeze bottle of polyethylene or other plastic or from a pressurized can.

In another practice of the invention, cyclic carbonate inner esters can be introduced into engine combustion chambers by removing the spark plugs and introducing the esters therein through apparatus normally occupied by the spark plugs. Subsequently, the engine is started and run to exhaust deposits which are dissolved and loosened by the cyclic esters from the engine.

The following examples illustrate the invention.

*Example I*

Propylene carbonate is incorporated in amount of 0.5% by volume in gasoline hydrocarbons which boil in the range of about 90° F. to 400° F. This formulation, when used as fuel in a spark ignition engine, reduces the accumulation of deposited material in the fuel intake system and in the engine combustion chambers.

*Example II*

A novel deposit removing formulation was prepared which comprised by volume 40% propylene carbonate, 55% ethyl acetate, and 5% ethylene glycol mono ethyl ether. This formulation had a kinematic viscosity at 100° F. of 0.82 centistoke and a surface tension of 30.2 dynes per cm. at 68° F., and thus had high penetration as compared to the propylene carbonate alone which has kinematic viscosity at 100° F. of 1.68 and surface tension of 43.4 dynes per cm. at 68° F. The novel formulation was used to remove deposits from a 1954 Buick engine which had been operated for about 29,000 miles. The Buick had an initial research octane requirement of about 92 numbers. About 400 cc. of the novel deposit removing formulation was introduced into the engine air intake breather pipe while the engine was idling. The engine was then stopped for about 15 minutes to allow the formulation to dissolve and loosen deposits. After this soaking period, the engine was started up and the car was driven for about 5 miles to insure complete exhausting of removed deposits from the engine. The octant requirement of the engine was then found to be about 90 numbers. Thus, practice of the present invention resulted in removal of engine deposits as evidenced by the octane requirement reduction of about 2 numbers.

I claim:

1. A solvent composition for the removal of engine deposits consisting essentially of from about 40 to 70% by volume ethyl acetate, from about 2 to 20% ethylene glycol monoethyl ether, and from about 25 to 60% of a cyclic carbonate inner ester having the formula:

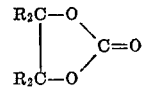

in which R is selected from the group consisting of hydrogen and alkyl, aryl, aralkyl, and alkaryl hydrocarbon groups having from 1 to 15 carbon atoms per group.

2. Solvent composition for the removal of engine deposits consisting essentially of by volume: about 40–70% ethyl acetate, about 2–20% ethylene glycol mono ethyl ether, and about 25–60% propylene carbonate.

3. Solvent composition for the removal of engine deposits consisting essentially of by volume about 55% ethyl acetate, 5% ethylene glycol mono ethyl ether and 40% propylene carbonate.

References Cited in the file of this patent

UNITED STATES PATENTS

| | | |
|---|---|---|
| 2,316,754 | Backoff et al. | Apr. 20, 1943 |
| 2,331,386 | Gaylor | Oct. 12, 1943 |
| 2,379,252 | Muskat et al. | June 26, 1945 |
| 2,784,201 | Chitwood | Mar. 5, 1957 |
| 2,789,891 | Brandes et al. | Apr. 23, 1957 |

OTHER REFERENCES

The condensed Chemical Dictonary, 5th ed., Reinhold Pub. Co., N.Y., June 1956, p. 909.